(12) United States Patent
Balasubramanian et al.

(10) Patent No.: US 9,397,950 B2
(45) Date of Patent: Jul. 19, 2016

(54) DOWNLINK SERVICE PATH DETERMINATION FOR MULTIPLE SUBSCRIPTION BASED SERVICES IN PROVIDER EDGE NETWORK

(71) Applicant: Telefonaktiebolaget L M Ericsson (publ), Stockholm (SE)

(72) Inventors: Chandramouli Balasubramanian, Mountain View, CA (US); Brian Kean, Cincinnati, OH (US); Peter J. Owens, San Jose, CA (US); George Apostolopoulos, Vancouver (CA); Ramanathan Lakshmikanthan, Santa Clara, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 179 days.

(21) Appl. No.: 13/666,779

(22) Filed: Nov. 1, 2012

(65) Prior Publication Data

US 2014/0119374 A1    May 1, 2014

(51) Int. Cl.
H04L 12/851 (2013.01)
H04L 29/08 (2006.01)

(52) U.S. Cl.
CPC ............ *H04L 47/2441* (2013.01); *H04L 67/28* (2013.01)

(58) Field of Classification Search
CPC . H04L 12/56; H04L 49/3009; H04L 12/5695; H04W 24/10
USPC ......................................................... 370/392
See application file for complete search history.

(56) References Cited

U.S. PATENT DOCUMENTS

| | | | | |
|---|---|---|---|---|
| 7,447,166 | B1* | 11/2008 | Kaluve et al. | 370/254 |
| 7,835,275 | B1* | 11/2010 | Swan et al. | 370/229 |
| 2002/0035639 | A1* | 3/2002 | Xu | 709/238 |
| 2005/0078668 | A1* | 4/2005 | Wittenberg et al. | 370/389 |
| 2005/0289244 | A1 | 12/2005 | Sahu et al. | |
| 2006/0265508 | A1* | 11/2006 | Angel et al. | 709/230 |

(Continued)

FOREIGN PATENT DOCUMENTS

JP    WO 2007/110951    *  9/2007 .......................... 726/7

OTHER PUBLICATIONS

F. Audet et al., "Network Address Translation (NAT) Behavioral Requirements for Unicast UDP," Jan. 2007, 29 pages, Network Working Group, Request for Comments: 4787, The IETF Trust.

(Continued)

*Primary Examiner* — Shaq Taha
(74) *Attorney, Agent, or Firm* — Patent Portfolio Builders, PLLC

(57) ABSTRACT

A method performed in a network element of a provider edge network to determine a downlink service path for a downlink packet. The method includes preserving an indication of the downlink service path while processing an uplink packet that has been transmitted from a subscriber end station toward a provider end station. The method also includes receiving the downlink packet at a line card of the network element. The downlink packet has been transmitted from the provider end station toward the subscriber end station. The method further includes determining, at the line card, the downlink service path for the downlink packet by using the indication of the downlink service path that was preserved while processing the uplink packet. The downlink service path is operable to identify a plurality of services and an order in which the plurality of services are to be performed on the downlink packet.

18 Claims, 9 Drawing Sheets

(56) References Cited

U.S. PATENT DOCUMENTS

| | | |
|---|---|---|
| 2006/0276209 A1* | 12/2006 | Neves et al. .................. 455/466 |
| 2007/0053374 A1* | 3/2007 | Levi .................... H04L 12/6402 370/431 |
| 2009/0003375 A1 | 1/2009 | Havemann et al. |
| 2009/0307092 A1* | 12/2009 | Gugliuzza et al. ......... 705/14.64 |
| 2011/0078326 A1* | 3/2011 | Horibuchi ..................... 709/232 |
| 2011/0145763 A1* | 6/2011 | Dong .................... H04L 43/045 715/823 |
| 2011/0179277 A1* | 7/2011 | Haddad et al. ................ 713/171 |

OTHER PUBLICATIONS

Pending U.S. Appl. No. 14/640,452.

* cited by examiner

SERVICE PATH BASED PACKET PROCESSING SYSTEM 608

DOWNLINK SERVICE PATH DETERMINATION FOR MULTIPLE SUBSCRIPTION BASED SERVICES IN PROVIDER EDGE NETWORK

BACKGROUND

1. Field

Embodiments of the invention relate to the field of networking; and more specifically, to the service chaining in the field of networking.

2. Background Information

A provider edge network may apply advanced subscription based services to packets through service path based chaining of the different advanced subscription based services. By way of example, an uplink packet from a subscriber may be forwarded to a subscriber terminating entity. The subscriber terminating entity may access per-subscriber service characterization information in order to determine an uplink service path that is appropriate for the uplink packet. The uplink service path may identify both services that are to be applied to the uplink packet, and an order in which the different services are to be applied to the uplink packet. The subscriber terminating entity may add an uplink service path identifier (ID) to the uplink packet, and then forward the uplink packet to the first service engine along the uplink service path. The first service engine may perform its associated service on the uplink packet. The first service engine may then use the uplink service path ID to identify the next service engine along the path where the uplink packet is to be forwarded. Similarly, other service engines along the uplink service path may forward the uplink packet according to the uplink service path ID.

However, one challenge with service path based chaining approaches is that determination of downlink service paths for downlink packets (e.g., transmitted from a provider end station toward a subscriber end station) tends to be more difficult to implement than determination of uplink service paths. When a downlink packet is received at a line card, typically the line card is not provisioned with per-subscriber service policy information, since this would generally tend to be scale-wise prohibitive. In one possible approach the line card may simply forward the packet to the subscriber terminating entity to allow the subscriber terminating entity to determine the appropriate downlink service path. One potential drawback is that this may result in the subscriber terminating entity needing to process the downlink packet twice, once at the beginning of the downlink service path (e.g., in order to determine the downlink service path), and again at the end of the downlink service path (e.g., to forward the downlink packets to an external element through the line cards). When the amount of packet traffic is high, this may tend to significantly limit the performance of the subscriber terminating entity.

In some prior approaches, the line card may use an Access Control List (ACL) based approach to determine the downlink service path. However, such ACL based approaches tend to have certain drawbacks. For one thing, with ACL based service chaining, application steering knowledge generally has to be known to the forwarding controller. For example, in ACL based approaches, the downlink service path is generally determined based primarily on the source port of the downlink packet identifying a particular type of service or application. For example, a source port of 80/8080 may identify HTTP, a source port of 443 may identify HTTPS, a source port of 20 may identify FTP, a source port of 25 may identify SMTP (e.g., email), and a source port of 3724 may identify gaming applications. The downlink service path determination is highly application dependent, which tends to limit the applicability of the ACL based approaches. Also such ACL based service chaining approaches are generally limited to service paths involving no more than generally about two different services. Furthermore, the ACL rules are generally statically programmed or configured on the line cards, rather than being dynamically adapted or learned during runtime. This tends to make changing or adding rules more difficult. Additionally, provisioning all of the line cards with the ACL rules may be scale-wise prohibitive when the number of subscribers is high.

Accordingly, new approaches for determining downlink service paths would be useful and would offer certain advantages.

SUMMARY

In one aspect, a method is performed in a network element of a provider edge network. The method is one of determining a downlink service path for a downlink packet. The method includes a step of preserving an indication of the downlink service path, while processing an uplink packet. The uplink packet has been transmitted from a subscriber end station toward a provider end station. The method also includes a step of receiving the downlink packet at a line card of the network element. The downlink packet has been transmitted from the provider end station toward the subscriber end station. The method further includes a step of determining, at the line card, the downlink service path for the downlink packet. The determination is made by using the indication of the downlink service path that was preserved while processing the uplink packet. The downlink service path is operable to identify a plurality of services and an order in which the plurality of services are to be performed on the downlink packet. One possible advantage of the method is that the line card is operable to determine the downlink service path without needing to include per-subscriber service policy information on the line card.

In another aspect, a network element is operable to be deployed in a provider edge network between a subscriber end station and a provider end station. The network element is operable to determine a downlink service path for a downlink packet. The downlink packet is to be transmitted from the provider end station toward the subscriber end station. The network element includes an uplink packet processing module that is operable to preserve an indication of the downlink service path while processing an uplink packet. The uplink packet is to be transmitted from the subscriber end station toward the provider end station. The network element also includes a line card that is operable to receive the downlink packet. The network element further includes a downlink service path determination module. The service path determination module is deployed on the line card. The service path determination module is operable to allow the line card to determine the downlink service path for the downlink packet. This is done by using the indication of the downlink service path that was preserved by the uplink packet processing module while processing the uplink packet. The downlink service path is operable to identify a plurality of services and an order in which the plurality of services are to be performed on the downlink packet. One possible advantage is that the line card is operable to determine the downlink service path without needing to include per-subscriber service policy information on the line card.

In yet another aspect, a method is performed in a provider edge network. The method is one of determining a downlink service path for a downlink packet. The method includes a step of receiving an uplink packet. The uplink packet has been transmitted from a subscriber end station toward a provider end station. The method also includes a step of translating a source port of the uplink packet to one of a set of translated source ports. The method further includes a step of receiving the downlink packet at a line card of the network element. The downlink packet has been transmitted from the provider end station toward the subscriber end station. The method also includes a step of determining, at the line card, the downlink service path for the downlink packet. This determination is made by determining that a port of the downlink packet is one of a set of ports that correspond to the downlink service path. The downlink service path is operable to identify a plurality of services and an order in which the plurality of services are to be performed on the downlink packet. One possible advantage is that the line card is operable to determine the downlink service path without needing to include per-subscriber service policy information on the line card.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus (e.g., network elements) to preserve an indication of a downlink service path for a downlink packet, through multiple subscription based services, while processing an uplink packet, within a provider edge network. In the following description, numerous specific details are set forth. For example, specific ways of preserving indications of downlink service paths, specific data structures, specific examples of services, specific orders of operations, specific logic partition and integration options, and the like, are set forth. However, it is understood that embodiments of the invention may be practiced without these specific details. In other instances, well-known circuits, structures and techniques have not been shown in detail in order not to obscure the understanding of this description.

Figure 1:
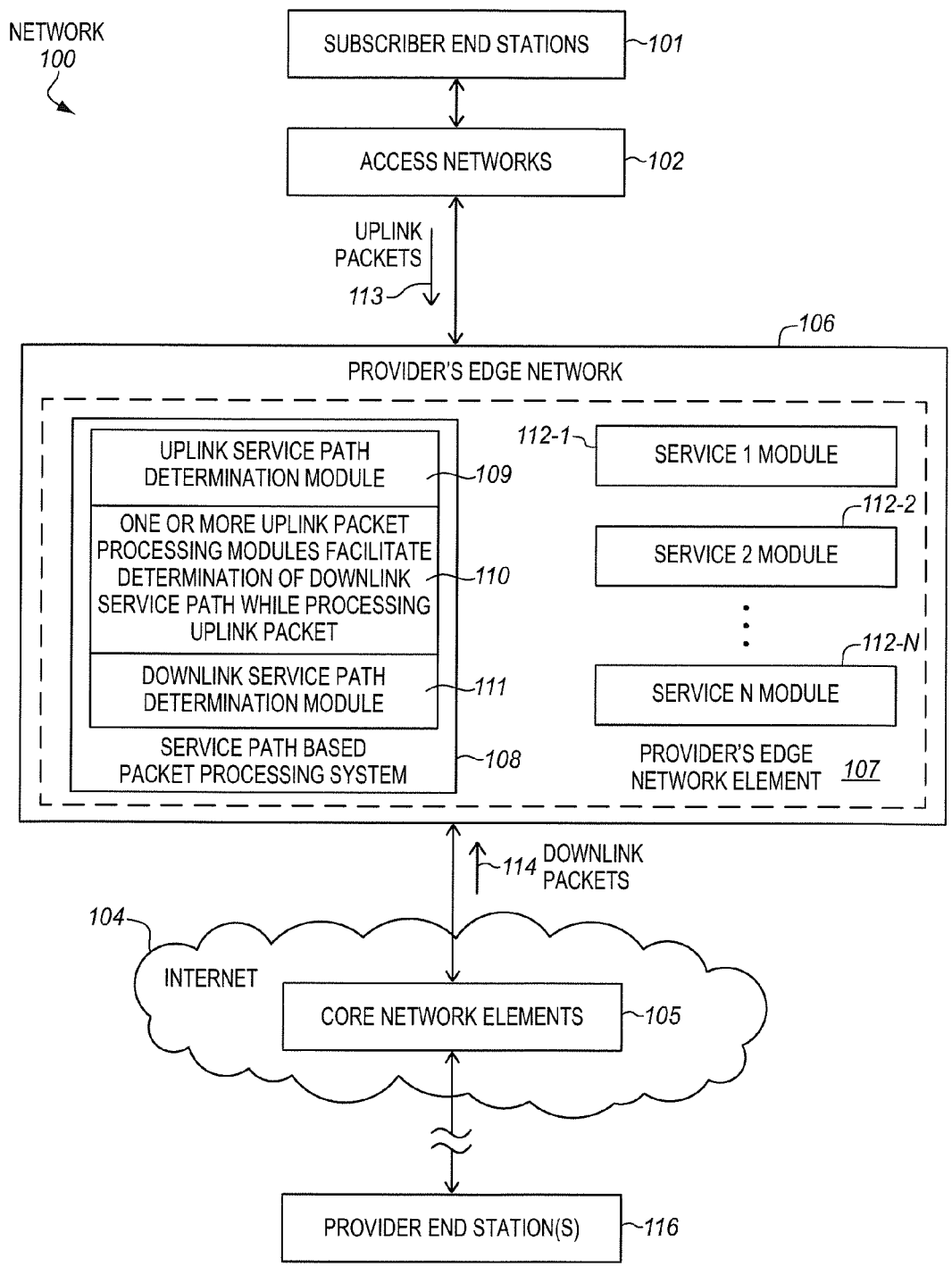
FIG. 1 is a block diagram of a provider edge network suitable for implementing embodiment of the invention.

FIG. 1 is a block diagram of a provider edge network 106 suitable for implementing embodiment of the invention. A network 100 includes a plurality of subscriber end stations 101. Examples of suitable subscriber end stations include, but are not limited to, servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes, and combinations thereof. The subscriber end stations access content/services provided over the Internet and/or content/services provided on virtual private networks (VPNs) overlaid on (e.g., tunneled through) the Internet. The content and/or services are typically provided by one or more provider end stations 116 (e.g., server end stations) belonging to a service or content provider. Examples of such content and/or services include, but are not limited to, public webpages (e.g., free content, store fronts, search services), private webpages (e.g., username/password accessed webpages providing email services), and/or corporate networks over VPNs, to name just a few examples.

As shown, the subscriber end stations 101 may be coupled (e.g., through customer premise equipment) to access networks 102 (wired or wirelessly). The access networks may be coupled to an embodiment of a provider edge network element 107 of the provider edge network 106. The provider edge network elements may be coupled through the Internet 104 (e.g., through one or more core network elements 105) to one or more provider end stations 116 (e.g., server end stations). In some cases, the provider edge network may host on the order of tens of thousands of wire line type subscriber end stations to on the order of millions of wireless subscriber end stations, although the scope of the invention is not limited to any known number.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols that communicate with other network elements to exchange routes and select those routes based on one or more routing metrics. Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane may use these forwarding and adjacency structures when forwarding traffic.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, IPSec, IDS, P2P), VoIP Session Border Controller, Mobile Wireless Gateways (e.g., GGSN, Evolved Packet System (EPS) Gateway)). By way of example, a service card may be used to terminate IPSec tunnels and execute the attendant authentication and encryption algorithms.

Some network elements include functionality for AAA (authentication, authorization, and accounting) protocols (e.g., RADIUS (Remote Authentication Dial-In User Service), Diameter, and/or TACAS+ (Terminal Access Controller Access Control System)). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic.

Referring again to FIG. 1, the subscriber end stations may transmit uplink packets 113 to or otherwise toward the provider end stations. The provider end stations may transmit downlink packets 114 to or otherwise toward the subscriber end stations. The uplink and downlink packets may traverse the provider edge network 106 and/or the provider edge network element 107. The provider edge network element and/or the provider edge network include a set of service modules, namely service module 1 112-1, service module 2 112-2, through service module N 112-N, to perform services on the uplink and downlink packets. In some aspects, the service modules may provide advanced subscription based services or operations. Examples of suitable services include, but are not limited to, Deep Packet Inspection (DPI) services, Transparent Internet Caching (TIC) services, Content Delivery Network (CDN) services, Network Address Translation (NAT) services. Other examples of suitable services include, but are not limited to, parental control services, Internet Protocol Security (IPSec) services, firewall services, WAN (wireless area network) optimization services, and profiling and flow tracking services. In some aspects, application of these services to subscriber traffic may be determined at least in part based on subscription policies (e.g., payment plans) associated with the subscribers or subscriber end stations. For example, one subscriber may desire the services of service module 1, service module 3, and service module 4, whereas another subscriber may desire to pay for the services of service module 2 and service module 3. In some aspects, these subscription policies may be included in the subscriber records or attributes associated with the subscribers or subscriber end stations.

An embodiment of a service path based packet processing system 108 is included in the provider edge network and/or the provider edge network element. The service path based packet processing system is operable to process the uplink and downlink packets according to uplink service paths and downlink service paths, respectively. In one aspect, the corresponding uplink and downlink packets may be of a same flow between a subscriber end station and a provider end station and/or in one aspect the downlink packet may be responsive to the uplink packet. As used herein, a service path, or path for short, represents two or more services to be performed on a packet, as well as an order in which the two or more services are to be performed on the packet. An uplink service path is one used for an uplink packet, whereas a downlink service path is one used for a downlink packet. Often, the uplink and downlink service paths are complementary to one another. For example, the order of the services in the downlink service path may be a reversal, or at least a substantial reversal, of the order of the services in the uplink service path. In other examples, the uplink and downlink service paths need not provide identical sets of services in reverse order, but rather may provide other complementary or corresponding sets of services.

In some embodiments, the service paths may be identified by service path identifiers (IDs) or path IDs for short. The path IDs may be expressed as a series of bits, a numerical value, or the like. As will be explained further below, in some embodiments the path IDs may be tagged, appended, or otherwise added to packets when they enter the service path based packet processing system and removed from the packets as they leave the service path based packet processing system. In some embodiments, as will be explained further below, the path IDs may allow the various service modules 1-N to know where they should forward the packets (e.g., to which other service module) according to the particular service path identified by the path ID.

The service path based packet processing system includes an uplink service path determination module 109 that is operable to determine uplink service paths for uplink packets, and a downlink service path determination module 111 that is operable to determine downlink service paths for downlink packets. In some embodiments, the service path based packet processing system may include one or more uplink packet processing modules 110 that are operable to facilitate determination of downlink service paths appropriate for downlink packets while processing corresponding uplink packets. In some embodiments, the uplink packet processing module(s) 110 may perform one or more operations while processing the uplink packet in order to facilitate determination of an appropriate downlink service path for the corresponding downlink packet. That is, extra work (e.g., one or more operations) may be performed in conjunction with the processing of the uplink packet to facilitate determination of the downlink service path for the downlink packet (e.g., make the determination easier, faster, more efficient, etc.). As will be explained further below, in some embodiments, this may include preserving an indication of an appropriate downlink service path while processing the uplink packet. In some embodiments, preserving the indication may include storing the indication in the uplink packet so that the indication will be returned with the downlink packet. In some embodiments, preserving the indication may include storing the indication in a cache or other storage.

Such a service path based chaining approach may tend to offer certain advantages. For one thing, authentication, per-subscriber service policy application, and uplink service path determination may be performed at an entry point into the service path (e.g., at a subscriber terminating entity). Thereafter, there may be no need for each of the different service modules to separately apply per-subscriber service policy information and/or determine whether or not they should perform service the packet. Additionally, there may be no need to provision each of the service modules with per-subscriber service policy information. By contrast, in a conventional linear service chaining approach, the packets would generally need to visit each service module, each service module would generally need to be provisioned with per-subscriber service policy information, and each service module would generally need to separately determine whether or not to service the uplink packet. Such replication of the per-subscriber service policy information, and such per-hop computation within each service module, generally tends to make such a linear service chaining approach more costly to implement and/or less scalable to large numbers of subscribers than the service path based chaining approach.

Additionally, there is no need to use a central chaining gateway. By contrast, in a conventional hub-and-spoke service chaining approach, a central chaining gateway may be used to control which service modules are to service the uplink packet and in what order. The uplink packet may be redirected back to the service chaining gateway after each service module processes the uplink packet, and the service chaining gateway may then forward the uplink packet onto the next service module. A potential drawback is that the service chaining gateway may need to be provisioned with sufficient bandwidth and processing resources to receive, process, and forward the uplink packets multiple times. As a result, this may tend to make such a hub-and-spoke service chaining approach more costly to implement and/or less scalable than the service path based chaining approach.

Figure 2:
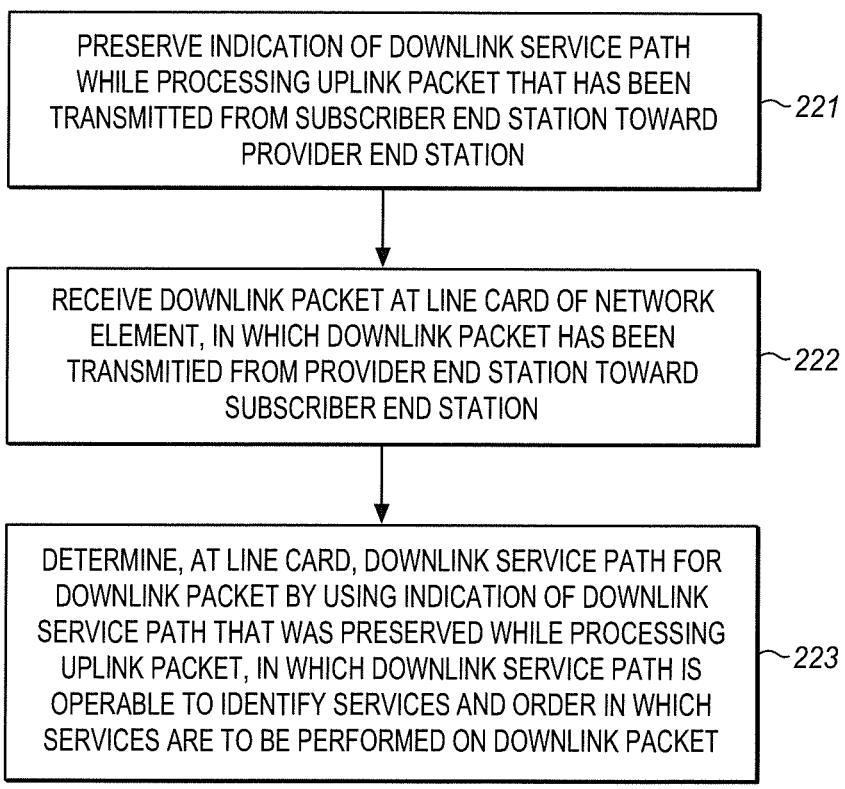
FIG. 2 is a block flow diagram of an embodiment of a method of determining a downlink service path for a downlink packet based on an indication of the downlink service path that has been preserved while processing an uplink packet.

FIG. 2 is a block flow diagram of an embodiment of a method 220 of determining a downlink service path for a downlink packet based on an indication of the downlink service path preserved while processing an uplink packet. In some embodiments, the method may be performed in a network element and/or a provider edge network. For example, in some embodiments, the method may be performed by the network element 107 and/or the provider edge network 106 of FIG. 1. Alternatively, the method may be performed by an entirely different network element or provider edge network. Moreover, the network element 108 and network 106 may perform entirely different methods than the method 220.

The method includes preserving an indication of the downlink service path while processing an uplink packet, at block 221. The uplink packet has been transmitted from a subscriber end station toward a provider end station. In some embodiments, the indication of the downlink service path may be a service path identifier (ID), for example, a downlink service path ID (or an uplink service path ID for which the reverse, complementary, or otherwise corresponding downlink service path ID can be readily determined).

In some embodiments, preserving the indication of the downlink service path may include modifying the uplink packet (e.g., storing the indication of the downlink service path in the uplink packet). For example, a source port of the uplink packet may be translated to a translated source port that indicates and/or corresponds to the downlink service path. In other embodiments, preserving the indication of the downlink service path may include storing the indication of the downlink service path in a cache or other storage along with one or more fields derived from the uplink packet. The fields derived from the uplink packet may either be fields extracted from the uplink packet and stored, or fields of the uplink packet that have been mapped to corresponding fields of the downlink packet (e.g., by swapping source and destination fields) and then stored.

Referring again to FIG. 2, the method includes receiving the downlink packet at a line card of the network element, at block 222. The downlink packet has been transmitted from the provider end station toward the subscriber end station.

The method also includes determining, at the line card, the downlink service path for the downlink packet by using the indication of the downlink service path that was preserved while processing the uplink packet, at block 223. The downlink service path is operable to identify a plurality of services and an order in which the plurality of services are to be performed on the downlink packet.

In some embodiments, determining the downlink service path may include examining the uplink packet (e.g., one or more fields thereof) and/or accessing the indication of the downlink service path from the uplink packet. For example, a destination port of the downlink packet (which has been swapped with or otherwise equals the translated source port of the uplink packet) may be accessed and examined. The destination port may indicate and/or correspond to the appropriate downlink service path. In other embodiments, determining the downlink service path may include accessing the indication of the downlink service path from a cache or other storage. For example, one or more fields derived from the downlink packet may be used to search the cache for the indication which was previously preserved with one or more corresponding fields derived from the uplink packet. As before, deriving the fields may include either extracting the fields, or extracting and swapping fields.

Figure 3:
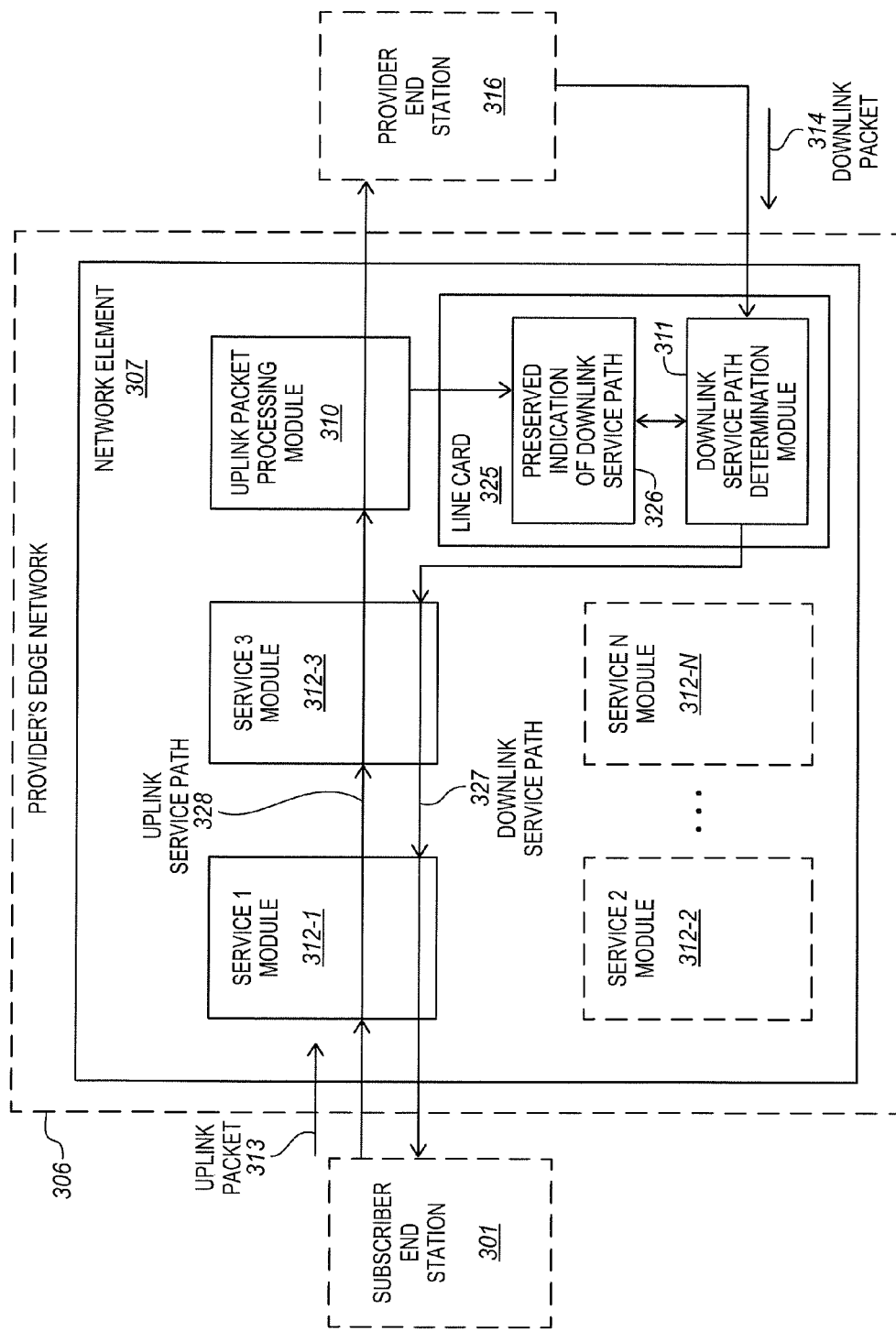
FIG. 3 is a block diagram of an embodiment of a network element that is operable to determine a downlink service path for a downlink packet based on an indication of the downlink service path that has been preserved while processing an uplink packet.

FIG. 3 is a block diagram of an embodiment of a network element 307 that is operable to determine a downlink service path 327 for a downlink packet 314 based on an indication 326 of the downlink service path that has been preserved while processing an uplink packet 313. In some embodiments, the network element is operable to be deployed in a provider edge network 306 between a subscriber end station 301 and a provider end station 316. In some embodiments, the network element 307 may perform the method 220 of FIG. 2. Alternatively, the network element 307 may perform entirely different methods. Moreover, the method 220 may be performed by entirely different network elements.

The network element includes an uplink packet processing module 310 located somewhere along uplink service path 328. The uplink packet processing module is operable to process the uplink packet. The uplink packet is to be transmitted from the subscriber end station toward the provider end station. The uplink packet processing module is also operable to preserve an indication 326 of the downlink service path, while processing the uplink packet 313. In some embodiments, the uplink packet processing module may be operable to store or otherwise preserve the indication of the downlink service path in the uplink packet. For example, a source port of the uplink packet may be translated to a translated source port that indicates and/or corresponds to the downlink service path. In other embodiments, the uplink packet processing module may be operable to store or otherwise preserve the indication of the downlink service path in a cache or other storage. For example, the indication of the downlink service path may be stored in a cache along with one or more fields derived from the uplink packet. In the illustrated embodiment, the uplink packet processing module is shown at an end of the uplink service path, although in other embodiments it may be located elsewhere (e.g., at an outlet of a subscriber termination module).

The network element also includes a line card 325. The line card is operable to receive the downlink packet 314. The downlink packet is to be transmitted from the provider end station toward the subscriber end station.

The network element also includes a downlink service path determination module 311. In some embodiments the downlink service path determination module is deployed on the line card that is to receive the downlink packet. The downlink service path determination module is operable to allow the line card to determine the downlink service path 327 for the downlink packet by using the indication 326 of the downlink service path that was preserved by the uplink packet processing module 310 while processing the uplink packet. In some embodiments, this may involve using one or more of the downlink packets 5-tuple parameters (e.g., one or more of a destination IP, destination port, source IP, source port, and protocol).

In some embodiments, the downlink service path determination module may be operable to determine the downlink service path by accessing the indication of the downlink service path from a cache or other storage. For example, the indication of the downlink service path may be accessed from a cache by using one or more fields derived from the downlink packet to search the cache. As shown in the illustrated embodiment, the indication 326 may be stored within the line card (e.g., stored in a cache of the line card), although this is not required. In other embodiments, the downlink service path determination module may be operable to determine the downlink service path by examining the uplink packet (e.g., one or more fields thereof) and/or accessing the indication of the downlink service path from the uplink packet. For example, a destination port of the downlink packet (which has been swapped with or otherwise equals a translated source port of the uplink packet) may indicate and/or correspond to the downlink service path.

The downlink service path is operable to identify at least two services and an order in which the at least two services are to be performed on the downlink packet. In the illustrated example, a service 1 module 312-1 and a service 3 module 312-3 are to service the downlink packet. In this example, the downlink packet is to be serviced by the service 1 and service 3 modules in a reverse order compared to the uplink packet. In the illustrated embodiment, the service 1 module and the service 3 module are optionally within the network element, although in other embodiments the service modules may optionally be distributed across two or more different network elements. In the illustrated example, the network element also optionally includes service module 2 312-2 through service module N 312-N which are not applied to the uplink or downlink packets.

Figure 4:
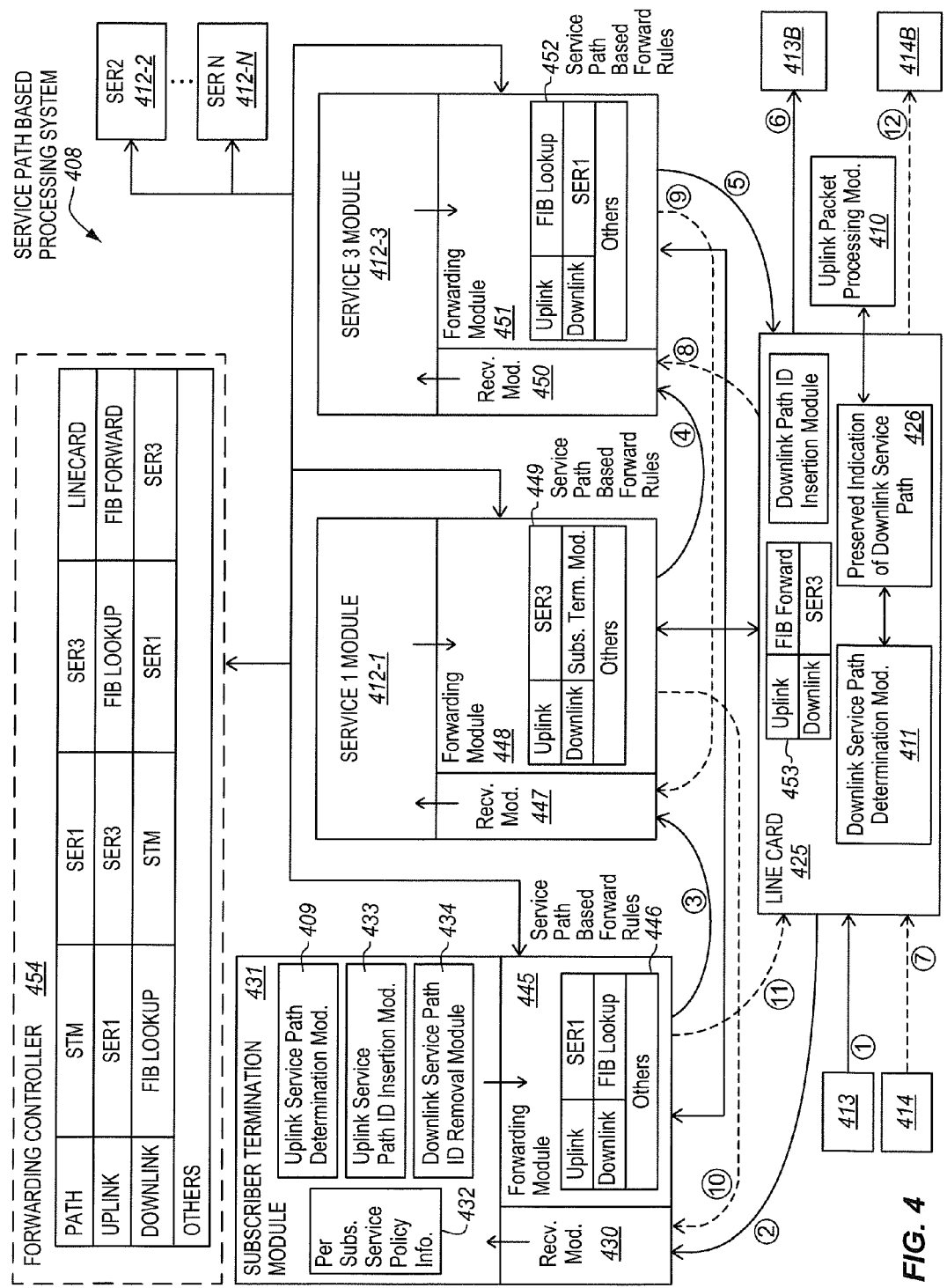
FIG. 4 is a block diagram of a detailed example embodiment of a service path based packet processing system.

FIG. 4 is a block diagram of a detailed example embodiment of a service path based packet processing system 408 that is operable to determine a downlink service path for a downlink packet based on an indication of the downlink service path preserved while processing an uplink packet. In some embodiments, the system may be implemented in a single network element. Alternatively, the system may be implemented in two or more coupled network elements.

As shown at numeral (1), an uplink packet 413 may be provided to a line card 425. The uplink packet may have a number of fields. For example, the uplink packet may include 5-tuple parameters including a source IP, a destination IP, a source port, a destination port, and a protocol identifier.

As shown at numeral (2), the line card may provide the uplink packet to a receive module 430 of a subscriber termination module 431. The subscriber termination module may represent a local anchor for subscribers in the network. The subscriber termination module may assign IP addresses and help to provide adherence to subscribed policies for subscriber traffic. Examples of suitable subscriber termination modules include, but are not limited to, a Broadband Network Gateway (BNG) module, an Evolved Packet Gateway (EPG) module, a Gateway GPRS Support Node-Mobile Packet Gateway (GGSN-MPG) module, and other types of subscriber termination modules known in the arts.

The subscriber termination module includes an uplink service path determination module 409 that is operable to determine an uplink service path for the uplink packet. In some embodiments, the uplink service path may be determined based on per-subscriber service policy specification information 432, one or more uplink packet filter rules (e.g., that specify an uplink service path based on a per-flow basis), or a combination thereof. The subscriber termination module, being the local anchor for subscribers, generally maintains such per-subscriber service policy specification information. As a result, determination of the uplink service path at the subscriber termination module can be made relatively effectively by conventional approaches using the available policy information. By way of example, the 5-tuple type information of the uplink packet may be used to identify a subscriber and then that subscribers corresponding service policy information may be identified in order to determine what uplink service path to use (e.g., which services the subscriber desires to have performed). After the appropriate uplink service path has been determined, an uplink service path identifier (ID) insertion module 433 may insert, append, or otherwise add an uplink service path ID to the uplink packet. It is to be appreciated that embodiments are not limited to any known way in which the uplink service path is determined.

After the uplink service path and/or the uplink service path ID have been determined, the uplink packet may be forwarded along the uplink service path (e.g. among the different appropriate service modules) by using the determined uplink service path and/or the uplink service path ID added to the uplink packet. Each module receiving the uplink packet may know to service the uplink packet because the uplink packet has been forwarded to that module (e.g., the uplink packet may only be forwarded to modules along the uplink service path that are to service the uplink packet). Moreover, each module receiving the uplink packet may forward the uplink packet to another module along the uplink service path. Each module may include a set of service path based forwarding rules (e.g., per-path or path-based forwarding rules). These may provide a next hop or forwarding destination for each different supported uplink and downlink path. As shown, in some embodiments, a forwarding controller 454 may optionally be included to help control, manage, or centrally orchestrate service path based packet forwarding. The forwarding controller may represent a central forwarding controller that is operable to manage and programs service paths within the system. The forwarding controller may maintain a collective set of service path based forwarding rules. The forwarding controller may program, configure, or otherwise provide these forwarding rules (next hops for each path) in the various modules.

As shown at numeral (3), in this particular example, the subscriber termination module may forward the uplink packet to service 1 module 412-1 (e.g., a DPI module, CDN module, TIC module, etc.). The subscriber termination module includes a forwarding module 445 that includes service path based forwarding rules 446. In some embodiments, each different supported service path may have a corresponding forwarding destination or next hop. In this particular example, the forwarding destination for the uplink service path (i.e., "uplink" in the illustration) is the service 1 module, as indicated in the forwarding rules. For the downlink service path (i.e., "downlink" in the illustration), the forwarding destination is a Forwarding Information Base (FIB) lookup. The rules may also include "other" next hops for other paths. The service 1 module 412-1 includes a receive module 447 to receive the uplink packet. The service 1 module may process or service the uplink packet with its corresponding service (e.g., DPI, CDN, TIC, etc.).

As shown at numeral (4), in this particular example, the service 1 module may forward the serviced uplink packet to service 3 module 412-3 (e.g., a DPI module, CDN module, TIC module, etc.). The service 1 module includes a forwarding module 448 that includes service path based forwarding rules 449. In this particular example, the forwarding destination from the service 1 module for the uplink service path is the service 3 module. The service 3 module 412-3 includes a receive module 450 to receive the serviced uplink packet. The service 3 module may process or service the uplink packet with its corresponding service (e.g., DPI, CDN, TIC, etc.).

As shown at numeral (5), in this particular example, the service 3 module may forward the serviced uplink packet to a line card 425. The service 3 module includes a forwarding module 451 that includes service path based forwarding rules 452. In this particular example, for the uplink service path the service 3 module is to perform an FIB lookup at the line card. As shown at numeral (6), the line card may forward the serviced uplink packet 413B to a next hop electrical device (e.g., an external network element). The line card includes forwarding rules 453 that specify that in the uplink service path the line card is to perform an FIB forward in say the Internet context.

In some embodiments an uplink packet processing module 410, somewhere along the uplink service path, may receive the uplink packet. In some embodiments, the uplink packet processing module may preserve an indication 426 of a downlink service path appropriate for a corresponding downlink packet, which will be discussed further below. For example, in some embodiments, the downlink service path may be a reversed service path, complementary service path, or other corresponding service path for the already known uplink service path.

As shown at numeral (7), a downlink packet 414 may be provided to the line card 425. The downlink packet may have a number of fields. For example, the downlink packet may include 5-tuple parameters including a source IP, a destination IP, a source port, a destination port, and a protocol identifier. In some embodiments, the line card includes a downlink service path determination module 411 that is operable to determine a downlink service path for the downlink packet. In some embodiments, the determination at the line card is made by using a preserved indication 426 of a downlink service path. Any of the embodiments described elsewhere herein are suitable. In the illustrated embodiment, the preserved indication 426 is stored on the line card, although this is not required for other embodiments, as will be discussed further below. In some embodiments, one or more fields of the downlink packet may be used in part to determine the downlink service path using the preserved indication.

Advantageously, in the illustrated embodiment, the line card 425 is operable to determine the downlink service path that is appropriate for the downlink packet. The line card does not need to simply forward the downlink packet to the subscriber termination module 431 to have it determine the appropriate downlink service path. As discussed in the background section, this may tend to make the approach less costly to implement and/or more scalable. Moreover, the line card is able to determine the downlink service path without need to be provisioned with per-subscriber service policy characterization information, which would tend to be scalewise prohibitive. Rather, the preserved indication of the downlink service path may be used. Still further, there is no need to use an Access Control List (ACL) based approach. The downlink service path need not be determined based primarily on the source port of the downlink packet identifying a particular type of service or application (e.g., HTTP, HTTPS, FTP, SMTP, gaming applications, etc.). Rather, the determination is relatively more application agnostic. This may tend to make the approach more flexible, more applicable to different types of service paths, and more applicable to service paths having potentially three or more different types of services chained together (which is generally not the case for ACL). Also, as will be explained further below, some embodiments may be dynamically adapted or learned during runtime rather than being statically programmed or configured on the line cards. Still further, as discussed in the background section, the ACL based approaches generally primarily determine the downlink service path based on a source port of the downlink packet, whereas in some embodiments a destination port of the downlink packet may be used instead, as will be explained further below.

As shown at numeral (8), in this particular example, the line card may forward the downlink packet to the service 3 module 412-3. The forwarding rules 453 of the line card specify that the service 3 module is the next hop for the downlink service path. The service 3 module may receive, service, and forward the downlink packet.

As shown at numeral (9), in this particular example, the service 3 module may forward the serviced downlink packet to the service 1 module. The forwarding rules of the service 3 module specify the next hop for the downlink service path as the service 1 module. The service 1 module may receive, service, and forward the downlink packet.

As shown at numeral (10), in this particular example, the service 1 module may forward the serviced downlink packet to the subscriber termination module. The forwarding rules of the service 1 module specify the next hop for the downlink service path as the subscriber termination module. The subscriber termination module may receive, service, and forward the downlink packet.

As shown at numeral (11), in this particular example, the subscriber termination module may forward the serviced downlink packet to the line card. The forwarding rules of the subscriber termination module specify an FIB lookup for the downlink service path. As shown, in some embodiments, the subscriber termination module may include a downlink path ID removal module 434 to remove a downlink service path ID from the downlink packet. Alternatively, the ID removal may be performed elsewhere (e.g., at the line card). As shown at numeral (12), the line card may forward the serviced downlink packet in the Internet context to a next hop electrical device (e.g., an external network element).

Figure 5:
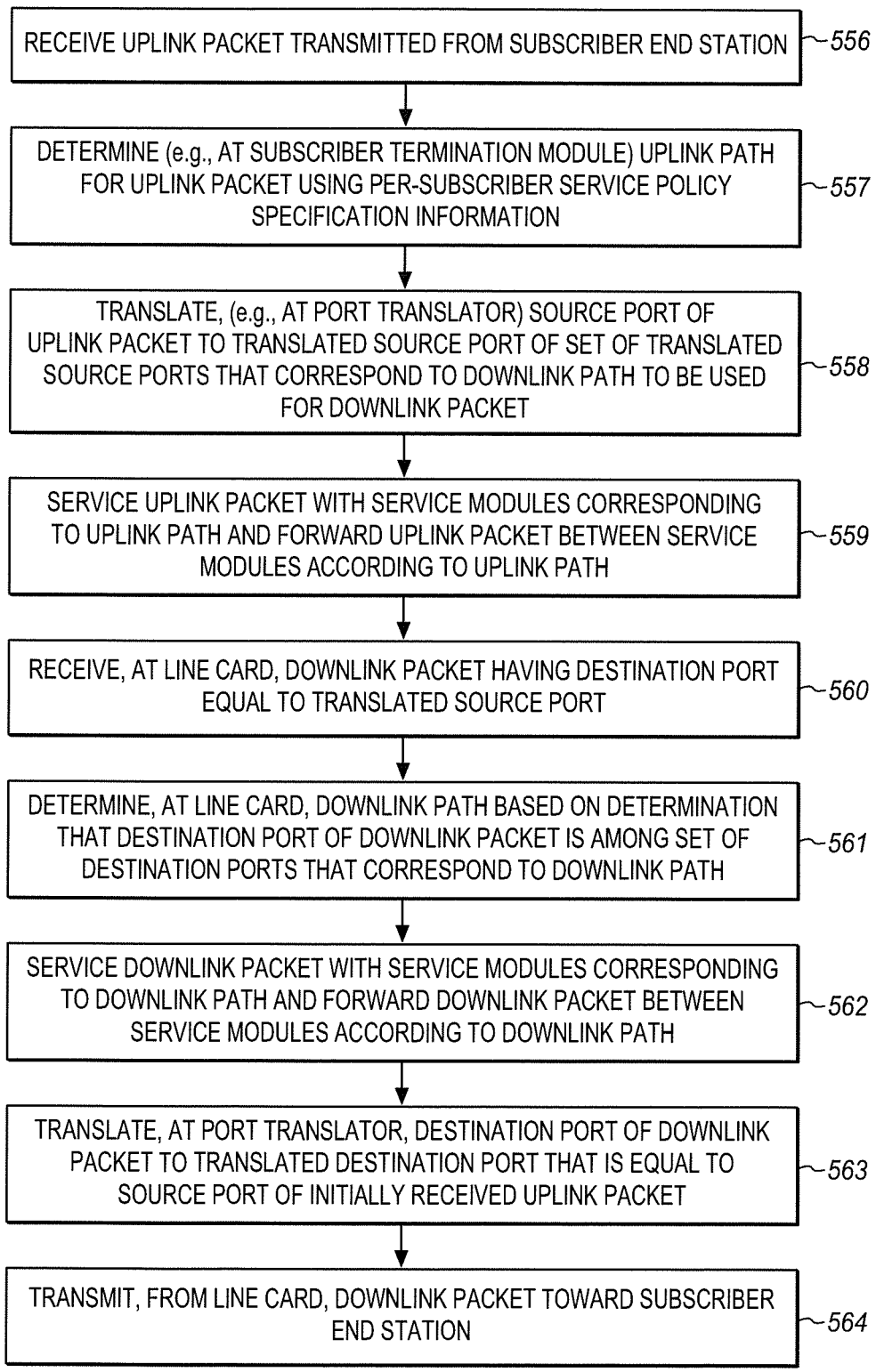
FIG. 5 is a block diagram of an embodiment of a method of facilitating a determination of a downlink service path for a downlink packet while processing uplink packet through translation of a port of the uplink packet.
Figure 6:
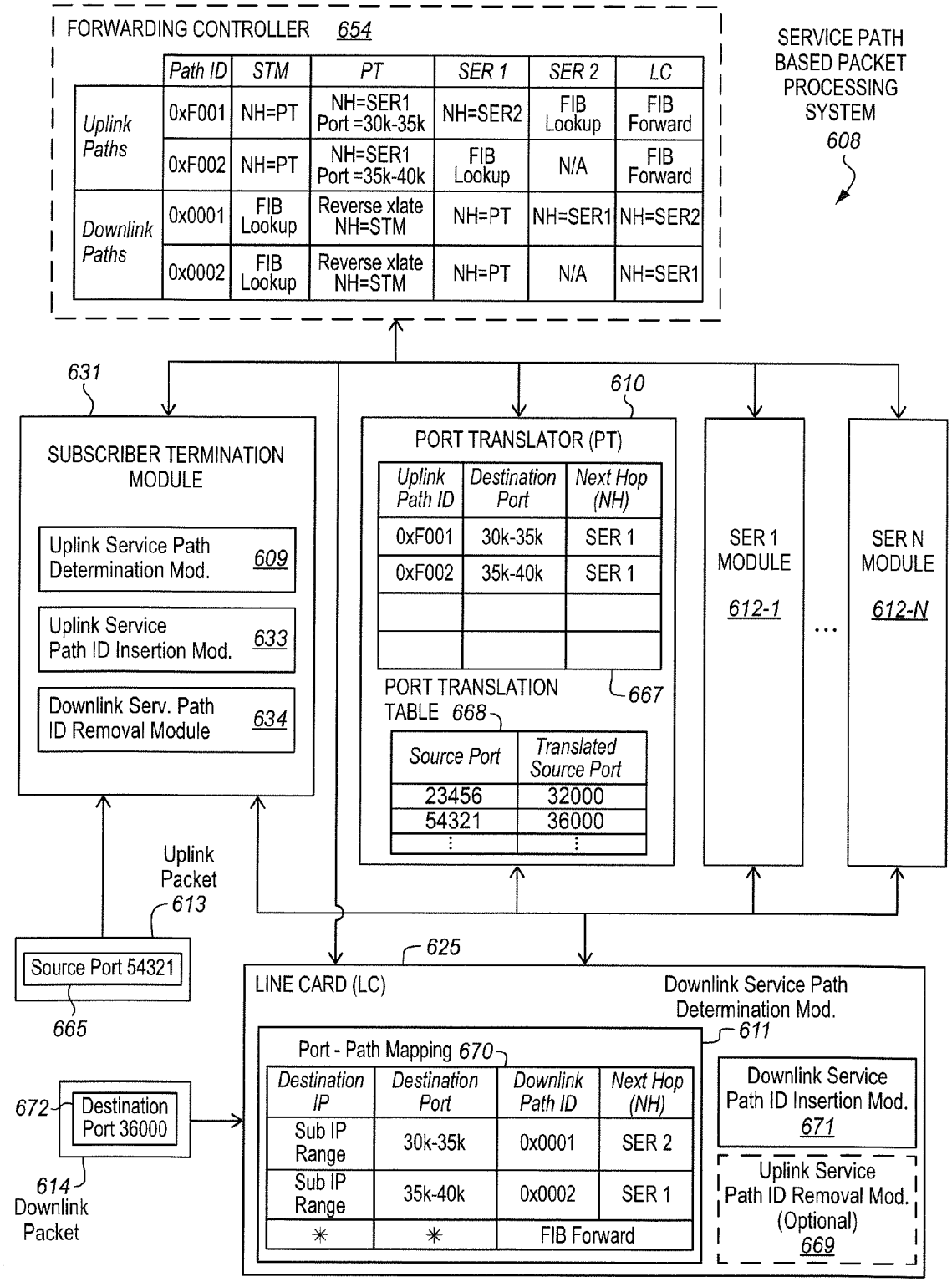
FIG. 6 is a block diagram of an embodiment of a service path based packet processing system to facilitate a determination of a downlink service path for a downlink packet while processing uplink packet through translation of a port of the uplink packet.

FIG. 5 is a block diagram of an embodiment of a method 555 of facilitating a determination of a downlink service path for a downlink packet while processing uplink packet through translation of a port of the uplink packet. FIG. 6 is a block diagram of an embodiment of a service path based packet processing system 608 to facilitate a determination of a downlink service path for a downlink packet while processing uplink packet through translation of a port of the uplink packet. To better illustrate certain concepts, the method of FIG. 5 with be described in conjunction with the system of FIG. 6. However, it is to be appreciated that the method 555 may be performed by entirely different systems, and that the system 608 can perform entirely different methods.

Referring to FIG. 5, at block 556, an uplink packet transmitted from subscriber end station may be received. For example, as shown in FIG. 6, an uplink packet 613 may be received at a subscriber termination module 631.

Referring to FIG. 5, at block 557, at a subscriber termination module, an uplink service path is determined for the uplink packet. For example, as shown in FIG. 6, the subscriber termination module includes an uplink service path determination module 609 to make the determination. Without limitation, this may be done substantially as previously described (e.g., using the 5-tuple information from the uplink packet to identify a subscriber and using the subscriber policy information to select the uplink service path). An uplink service path ID insertion module 633 may insert or otherwise add a path ID to the uplink packet.

Referring to FIG. 5, at block 558, in some embodiments, a source port of the uplink packet is translated (e.g., at a port translator) to a translated source port of a set of translated source ports that correspond to a downlink service path that is appropriate for and/or that is to be used for a subsequent downlink packet. For example, as shown in FIG. 6, an embodiment of a port translator 610 may translate a source port 665 of the uplink packet 613 to a translated source port.

In some embodiments, different uplink service paths and/or uplink service path IDs may each have a different corresponding set of translated source ports. The correspondence may be relatively static during runtime. For example, a first uplink service path (e.g., having a first uplink service path ID 0xF001) may have a first corresponding set of ports (e.g., a contiguous range of translated source ports 30K-35K), whereas a second uplink service path (e.g., having a second uplink service path ID 0xF002) may have a second, different corresponding set of ports (e.g., a contiguous non-overlapping range of translated source ports 35K-40K). Such correspondence may be stored in a table 667 of the port translator. By way of example, if the first uplink service path was determined for the received uplink packet, then the port translator may translate the source port to a translated source port in the first set of ports (e.g., a translated source port in the range of ports 30K-35K). Alternatively, if the second uplink service path was determined for the received uplink packet, then the port translator may translate the source port to a translated source port in the second set of ports (e.g., a translated source port in the range of ports 35K-40K). In the illustration, the later is the case, and the source port 54321 of the received uplink packet is translated to a translated source port 36000, although this is merely illustrative. This translation or mapping may be stored in a port translation table 668 of the port translator for reverse port translation of the downlink packet as will be described further below. In other embodiments, it is not required to use contiguous ranges of ports but rather non-contiguous sets or groups of ports may be used.

As will be described further below, the translated source port, indicating the determined uplink service path, as well as it's corresponding reverse, complementary, or otherwise corresponding downlink service path, will come back in the downlink packet as a destination port (i.e., the translated source port of the uplink packet will be used as the destination port of the downlink packet) such that the destination port of the downlink packet will also indicate the downlink service path. The port translation module may represent an embodiment of an uplink packet processing module to preserve an indication of a downlink service path for a downlink packet. In such embodiments, the indication of the downlink service path is preserved through port translation. That is, the indication is stored or otherwise preserved in the translated source port of the uplink packet (i.e., one of the 5-tuple type fields of the uplink packet) and returned via the destination port of the downlink packet.

Referring to FIG. 5, at block 559, the uplink packet is serviced with the service modules corresponding to uplink service path and the uplink packet is forwarded between the service modules of the uplink service path according to the determined uplink service path (e.g., the uplink service path ID). For example, as shown in FIG. 6, the port translator may forward the uplink packet to a service 1 module 612-1 consistent with the selected path ID 0xF002. Thereafter, forwarding of the uplink packet between the service modules and eventually out through the line card to external electrical devices may be performed substantially as described elsewhere herein (e.g., in conjunction with FIG. 4), or as is otherwise conventionally done. In some cases, mid-path changes may be made without limitation to the scope of the invention (i.e., it is not required to complete the selected service path). An uplink service path removal module 669, in the illustrated embodiment optionally located on the line card but optionally alternatively located elsewhere, may remove the uplink service path ID prior to the uplink packet being transmitted out.

Referring to FIG. 5, at block 560, a corresponding downlink packet is received, at a line card. In some embodiments, the downlink packet has a destination port that is equal to the translated source port of the uplink packet. For example, as shown in FIG. 6, downlink packet 614 may be received at the line card 625. As shown in the illustrated example, the destination port 672 (e.g., 36000) of the downlink packet may be equal to the translated source port (e.g., 36000) of the uplink packet. That is, when switching from the uplink direction to the downlink direction, the translated source port of the uplink packet may become the destination port of the downlink packet.

Referring to FIG. 5, at block 561, a determination is made, at the line card, of a downlink service path that is appropriate for the downlink packet based on a determination that a destination port of the received downlink packet is among set of a destination ports that correspond to the downlink service path. For example, as shown in FIG. 6, the line card 625 may include a downlink service path determination module 611 that is operable to determine a downlink service path that is appropriate for the received downlink packet 614 based on a determination that a destination port 672 of the downlink packet is among set of a destination ports that correspond to the downlink service path. In some embodiments, the destination port equals the translated source port of the corresponding uplink packet. The destination port, which is indicative of the destination service path, represents an embodiment of a preserved indication of the destination service path (in this case stored or otherwise preserved within fields of the uplink and downlink packets). A downlink service path ID insertion module 671, in this embodiment on the line card, may insert or otherwise add a downlink service path ID to the downlink packet.

In some embodiments, the downlink service path determination module may include a destination port-path mapping 670 (e.g., a table or other data structure). The port-path mapping may map destination ports to downlink service paths in a reverse, complementary or corresponding way in which translated source ports of the uplink packet were mapped to the uplink service path. In some embodiments, different downlink service paths and/or path IDs may each have a different corresponding set of destination ports. For example, a first downlink service path (e.g., having a first downlink service path ID 0x0001) may have a first corresponding set of destination ports (e.g., a contiguous range of destination ports 30K-35K), whereas a second downlink service path (e.g., having a second downlink service path ID 0x0002) may have a second, different corresponding set of destination ports (e.g., a contiguous non-overlapping range of destination ports 35K-40K). By way of example, if the destination port of the downlink packet is determined to be among the first set of destination ports (e.g., within the contiguous range of destination ports 30K-35K), then the downlink service path ID 0x0001 may be selected for the downlink packet. Alternatively, if the destination port of the downlink packet is determined to be among the second set of destination ports (e.g., within the contiguous range of destination ports 35K-40K), then the downlink service path ID 0x0002 may be selected for the downlink packet. In the illustrated example, the destination port of the downlink packet is 36000 such that the downlink service path ID 0x0002 would be selected, although this is merely an illustrative example. Moreover, in other embodiments, it is not required to use contiguous ranges of ports, but rather non-contiguous sets or groups of ports may be used. A subscriber IP (sub IP) range may be used to indicate the routing decisions toward an access side of the network. It may also be used to help identify packets for which services are desired (e.g., subscriber-related packets).

Typically a limited number of different service paths are provided by a system. Often, the number of different service paths are on the order of tens (e.g., between about 5 and about 150, often between about 5 and about 100). In other cases, there may be more, but usually the number of different service paths is not extremely large (e.g., often not larger than several hundred). Advantageously, the line card is able to determine the appropriate downlink service paths by performing lookups in relatively small port-path mapping tables, data structures, or maps. Lookups in such relatively small tables generally tend to be fast to implement and the tables generally tend to not require much storage. This helps to make the downlink service path determination more scalable to potentially large numbers of subscribers as compared to other approaches known in the arts.

Referring to FIG. 5, at block 562, the downlink packet is serviced with the service modules corresponding to the downlink service path and forwarded between these service modules according to downlink service path. For example, as shown in FIG. 6, the line card may forward the downlink packet using a next hop (NH) that is dependent upon the determined downlink service path. In the illustration, for downlink service path ID 0x0001 the next hop is the service 2 module (Ser2), whereas for downlink service path ID 0x0002 the next hop is the service 1 module (Ser1). The servicing and forwarding may be performed substantially as previously described (e.g., in conjunction with FIG. 4). In some cases, mid-path changes may be made without limitation to the scope of the invention (i.e., it is not required to complete the selected service path).

Referring to FIG. 5, at block 563, the destination port of the downlink packet is reverse translated (e.g., at the port translator) to a reverse translated destination port that is equal to source port of the initially received uplink packet. For example, as shown in FIG. 6, when the downlink packet reaches the port translator the port translator may access the port translation table 668 to determine a reverse port translation mapping from the destination port to a reverse translated destination port. In the illustrated example, the destination port 36000 may be reverse translated to destination port 54321, although this is merely an illustrative example.

Referring to FIG. 5, at block 564, the serviced or processed downlink packet may be transmitted, from the line card, toward the appropriate subscriber end station. For example, as shown in FIG. 6, after a downlink service path ID removal module 634 of the subscriber termination module removes the path ID from the downlink packet an FIB lookup may be performed and an FIB forward in Internet context may be performed through either the same or different line card.

Figure 7:
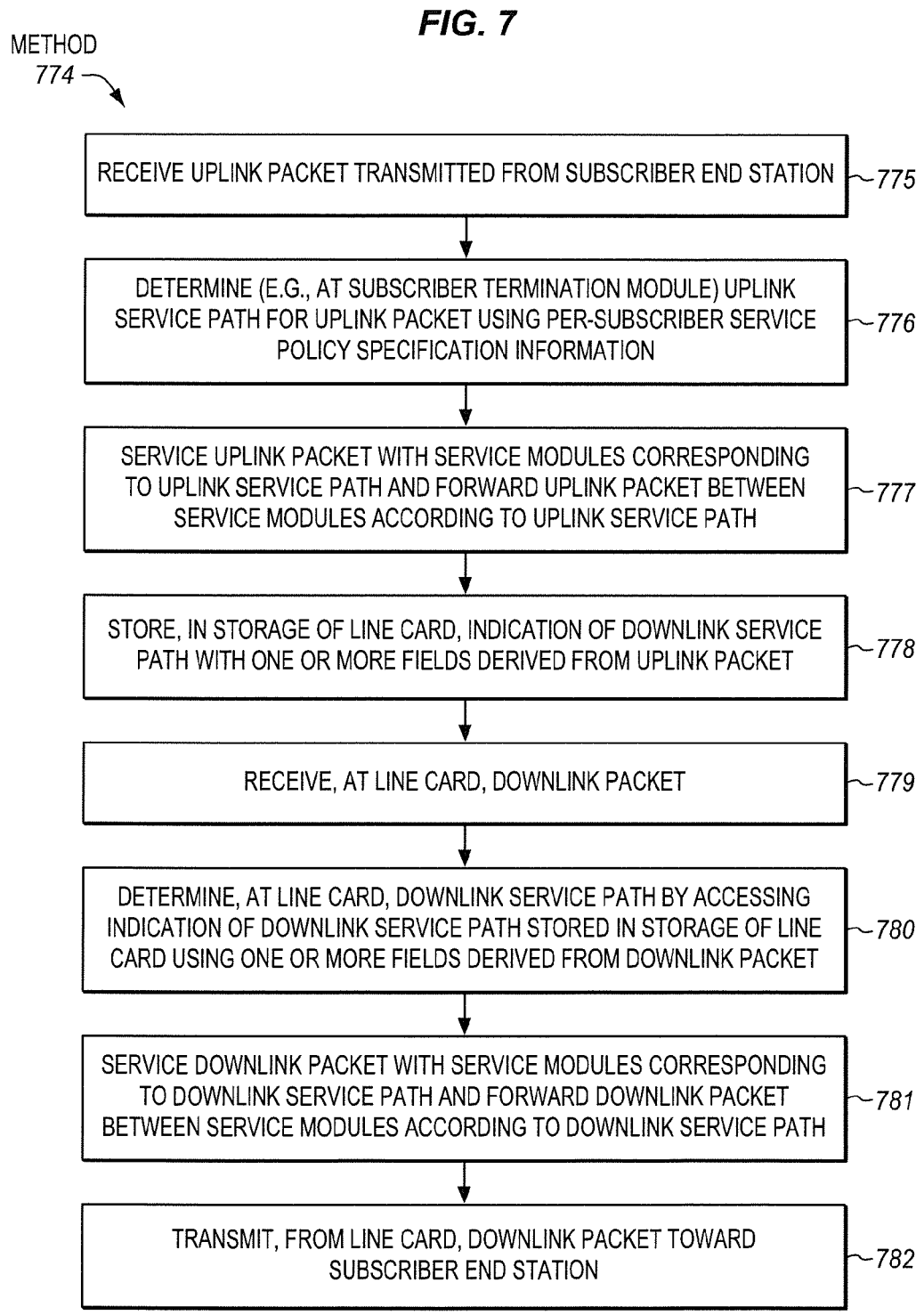
FIG. 7 is a block diagram of an embodiment of a method of facilitating a determination of a downlink service path for a downlink packet while processing uplink packet through learning and storing the downlink service paths in a cache or other storage.
Figure 8:
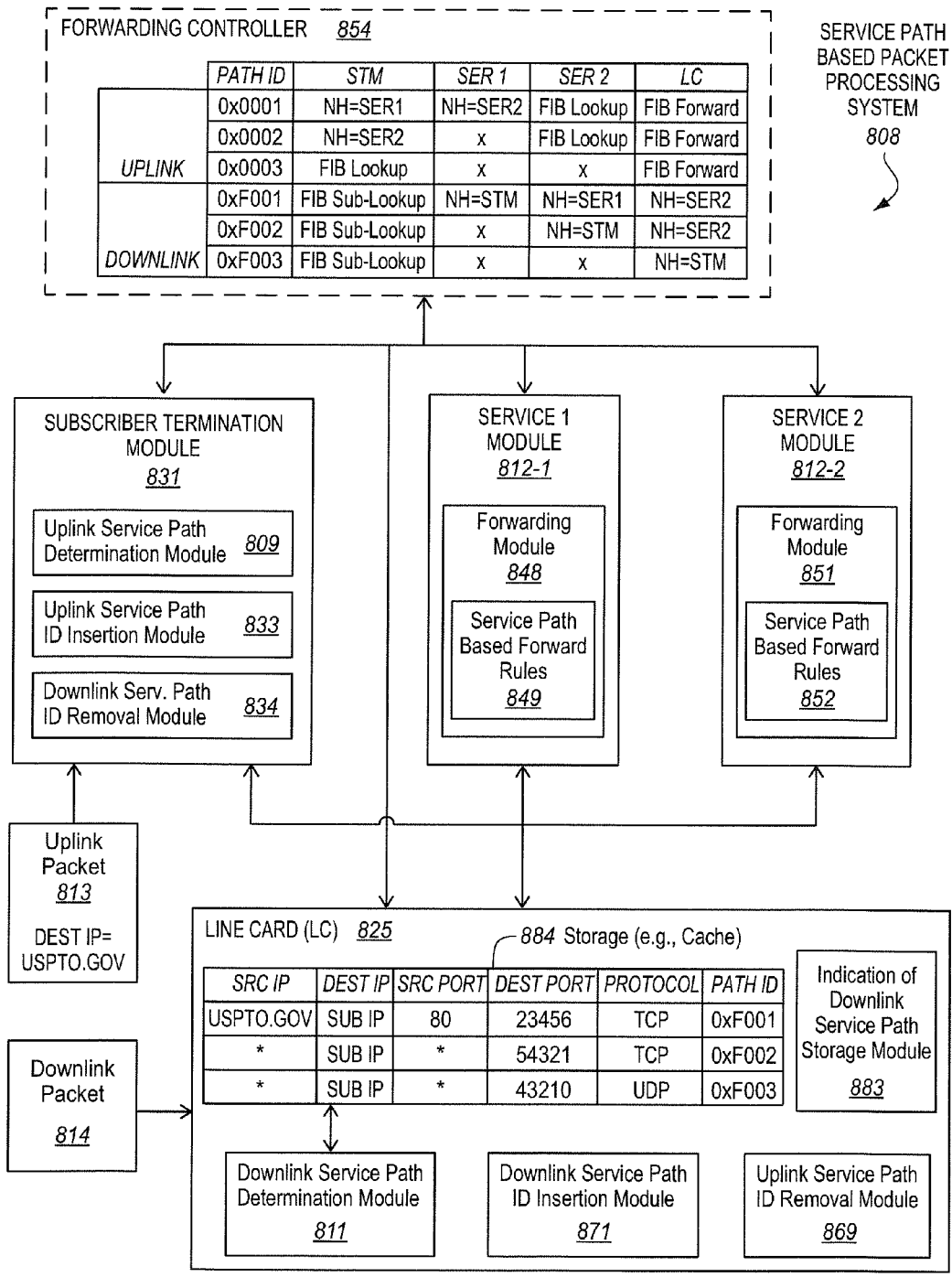
FIG. 8 is a block diagram of an embodiment of a service path based packet processing system to facilitate a determination of a downlink service path for a downlink packet while processing uplink packet through learning and storing the downlink service paths in a cache or other storage.

FIG. 7 is a block diagram of an embodiment of a method 774 of facilitating a determination of a downlink service path for a downlink packet while processing uplink packet through learning and storing the downlink service paths in a cache or other storage. FIG. 8 is a block diagram of an embodiment of a service path based packet processing system 808 to facilitate a determination of a downlink service path for a downlink packet while processing uplink packet through learning and storing the downlink service paths in a cache or other storage. To better illustrate certain concepts, the method of FIG. 7 with be described in conjunction with the system of FIG. 8. However, it is to be appreciated that the method 774 may be performed by entirely different systems, and that the system 808 can perform entirely different methods.

Referring to FIG. 7, at block 775, an uplink packet transmitted from subscriber end station may be received. For example, as shown in FIG. 8, an uplink packet 813 may be received at a subscriber termination module 831.

Referring to FIG. 7, at block 776, an uplink service path is determined (e.g., at a subscriber termination module) for the uplink packet. For example, as shown in FIG. 8, the subscriber termination module includes an uplink service path determination module 809 to make the determination. Without limitation, this may be done substantially as previously described (e.g., using per-subscriber service specification information). An uplink service path ID insertion module 833 may insert or otherwise add an uplink service path ID to the uplink packet.

Referring to FIG. 7, at block 777, the uplink packet is serviced with the service modules corresponding to uplink service path and the uplink packet is forwarded between the service modules of the uplink service path according to the determined uplink service path (e.g., the uplink service path ID). For example, as shown in FIG. 8, the subscriber termination module may forward the uplink packet consistent with the selected uplink service path. Then, one or more other modules (e.g., one or more of service module 1 812-1 through service module N 812-N) may similarly forward the uplink packet consistent with the selected uplink service path. A forwarding controller may program, configure, or provide service path based forwarding rules 849, 852 into forwarding modules 848, 851. This may be done substantially as described elsewhere herein or by using conventional approaches known in the arts.

Referring to FIG. 7, at block 778, an indication of an appropriate downlink service path for a subsequent downlink packet, along with one or more fields derived from the uplink packet, may be stored or otherwise preserved in a cache or other storage of the line card. For example, as shown in FIG. 8, line card 825 may have a module 883 that is operable to store indications of downlink service paths along with one or more fields or parameters derived from uplink packets in a cache or other storage 884. That is, the line card may dynamically learn and preserve the indications of the downlink service paths while processing the uplink packets (i.e., during runtime based on learning from the uplink packet processing).

In some embodiments, the module 883 may parse the uplink packet to learn and preserve the service path ID along with one or more packet fields. In some embodiments, an uplink service path ID (which may be indicative of and/or used to determine a corresponding reverse, complementary, or otherwise corresponding downlink service path ID) may be stored along with one or more fields of the uplink packet (or one or more swapped/corresponding fields of the downlink packet). In other embodiments, a downlink service path ID (which may be determined from the uplink service path ID) may be stored along with one or more fields of the uplink packet (or one or more swapped/corresponding fields of the downlink packet). As shown, in one particular embodiment, each of a source IP, a destination IP, a source port, a destination port, and a protocol for the downlink packet may be stored in the cache or other storage along with a downlink service path ID, although the scope of the invention is not so limited. In other embodiments, a subset of such parameters sufficient to uniquely identify the indication of the destination service path may be stored (e.g., only one of the uplink and downlink service path IDs together with at least a destination port). Such information in the cache or other storage represents an embodiment of a preserved indication of the destination service path.

Referring to FIG. 7, at block 779, a corresponding downlink packet is received, at a line card. For example, as shown in FIG. 8, downlink packet 814 may be received at the line card 825. When switching from the uplink direction to the downlink direction, the source and destination ports of the downlink packet may be swapped with those of the uplink packet.

Referring to FIG. 7, at block 780, a determination is made, at the line card, of a downlink service path that is appropriate for the downlink packet by accessing the indication of the downlink service path that is stored or otherwise preserved in the storage of the line card using one or more fields derived from downlink packet. For example, as shown in FIG. 8, the line card 825 may include a downlink service path determination module 811 that is operable to determine a downlink service path that is appropriate for the received downlink packet 814 by accessing the indication of the downlink service path (e.g., a path ID) that is stored or otherwise preserved in the storage 884 of the line card using one or more fields derived from downlink packet. In some embodiments, the storage 884 may be a cache. Alternatively, the storage may be a table, information base, database, or other conventional way of storing similar types of information.

In some embodiments, the downlink service path determination module may access the cache or other storage with one or more packet fields (e.g., of the downlink packet or swapped for those of the uplink packet) to determine the indicated downlink service path (e.g., by accessing an uplink or downlink path ID from the cache). For example, the one or more fields or parameters may be used as a key to search or access the cache or other storage. If there is a miss in the cache, other approaches known in the art (e.g., static steering to a subscriber termination module, based on ACL rules, etc.) may be used to determine the path, although the scope of the invention is not so limited. A downlink service path ID insertion module 871, in this embodiment of the line card, may insert or otherwise add a downlink service path ID to the downlink packet.

The total number of active flows in a system is generally lesser than the total number of connected subscribers (e.g., those idle together with those active). Further, the number of these flows that visit multiple services and use chaining would be an even lesser number. Accordingly, the cache or other storage generally will have a size that is appropriate for most implementations. If desired, actions may be taken to further reduce the size of the cache or storage. For example, in some embodiments, when storing information in the cache or other storage, the flow learning process may optionally be used to group flow parameters that map to a same path ID in order to help reduce the size of the cache or storage. Grouping destination ports into sets or contiguous ranges similarly to the approach shown and described with respect to FIGS. 5-6 is one example. Other embodiments may analogously group based on other parameters. However, this is not required.

Referring to FIG. 7, at block 781, the downlink packet is serviced with the service modules corresponding to the downlink service path and forwarded between these service modules according to downlink service path. For example, as shown in FIG. 8, the line card may forward the downlink packet using a next hop (NH) that is dependent upon the determined downlink service path. The servicing and forwarding may be performed substantially as previously described (e.g., in conjunction with FIG. 4). In some cases, mid-path changes may be made without limitation to the scope of the invention (i.e., it is not required to complete the selected service path).

Referring to FIG. 7, at block 782, the serviced or processed downlink packet may be transmitted, from the line card, toward the appropriate subscriber end station. For example, as shown in FIG. 8, after a downlink service path ID removal module 834 of the subscriber termination module removes the path ID from the downlink packet an FIB lookup may be performed and an FIB forward in Internet context may be performed through either the same or different line card.

In other embodiments, a method may include purging or otherwise removing one or more entries or data from the cache or other storage. For example, the entries or data may be removed based on one of a detection of a flow termination and a detection of a flow aging threshold being met (e.g., the age of the flow meeting (e.g., reaching or exceeding, etc.) a certain age). In one example, for TCP the tracking of a "SYN" flag may be employed to detect termination of flows and provide guidance of which entries or data may be purged or removed from the cache. For other protocols, such as UDP, flow aging mechanisms may be used to detect and delete relatively older or stale flows.

Still other embodiments pertain to network elements, provider edge networks, or service path based packet processing systems that employ a combination of port translation (e.g., analogously as described in conjunction with FIGS. 5-6) and a cache or other storage (e.g., analogously as described in conjunction with FIGS. 7-8). The port translator offers an advantage of implementing the uplink and downlink service path steering as port translation based forwarding (e.g., using single field of the downlink packet to look up the downlink service path). The cache or other storage approach offers a more flexible advantage of flow learning. The flow learning helps to allow for dynamic changes and/or flexibility. One illustrative example where a combination of port translation and caching may be useful is for mid-flow path migration. For example, say a subscriber's policy indicates that an uplink packet should visit service 1, service 2, and service 3 in the uplink direction. The port translator may perform port translation as previously described to change the port numberings. The uplink packet's initial path-X is from the subscriber termination module, then to the service 1 module, then to the service 2 module, then to the service 3 module, and then to the line card. Consider that within the service 1 module it is determined that the flow no longer needs the service 1. For example, this could be the case when DPI or a virus scanner is determined to be removed once it is known that the user is watching a long video. Now let's say the subscriber termination module changes the uplink packet's path to a path-Y that is from the subscriber termination module, then to the service 2 module (skipping over the service 1 module), then to the service 3 module, and then to the line card. Since the packets 5-tuples are fixed, the port may not be translated again. In some embodiments, in such scenarios involving mid-flow path migration, the cache (or other storage) based approach may provide flow learning to allow these exceptions to be accounted for. That is, in some embodiments, the fixed path services may be handled by the port translator to help reduce the amount of flow state that needs to be stored in the cache, and any mid-flow path changes may be accounted for with flow learning through the cache based approaches which allow for dynamic changes in real time. Advantageously, the port translation may help to provide compact flow state in the cache, and the cache may allow for fast dynamic updates for exception scenarios (e.g., mid-flow path migration).

Various non-transparent applications or services are known in the arts. Examples of such non-transparent services or applications include, but are not limited to, network address translation (NAT), MSP, various forms of tunneling protocols, various media gateways, etc. These non-transparent applications or services may modify the contents of the packet (source IP, source ports, packet length, checksum etc) to aggregate traffic and/or hide the presence of services behind them. In some embodiments, steering and/or service path determination may be based on the presence of such non-transparent applications.

Figure 9:
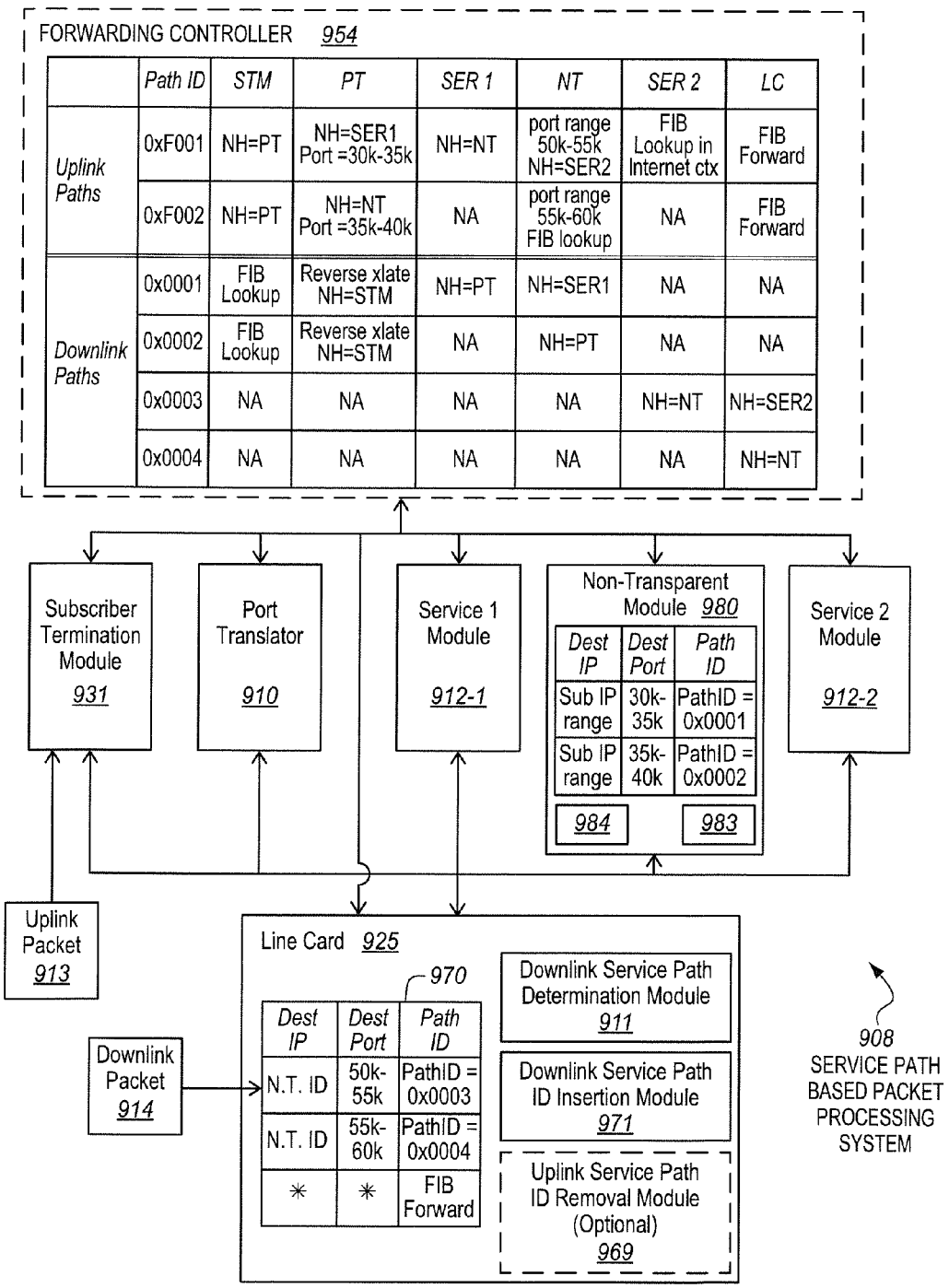
FIG. 9 is a block diagram of an embodiment of a service path based packet processing system to facilitate a determination of a downlink service path for a downlink packet while processing uplink packet that includes a non-transparent service module.

FIG. 9 is a block diagram of an embodiment of a service path based packet processing system 908 to facilitate a determination of a downlink service path for a downlink packet while processing uplink packet that includes a non-transparent service module 980. The system includes a forwarding controller 954, a subscriber termination module 931, a port translator 910, a service 1 module 912-1, a service 2 module 912-2, and a line card 925. The line card includes a downlink service path determination module 911, a downlink service path ID insertion module 971, and an optional uplink service path ID removal module 969. The aforementioned modules and components may be similar to or the same as those discussed elsewhere herein. The discussion below will tend to emphasize the different or additional features. The system also includes a non-transparent service module 980. For at least one downlink service path, the non-transparent service module 980 is logically coupled or in communication between the service 1 and service 2 modules.

In the uplink direction, the port translator 910 may translate a source port of an uplink packet 913 to a translated source port similarly as previously described. The non-transparent service module may translate the translated source port from the port translator to a re-translated source port. The non-transparent service module may be configured to use different port ranges in the uplink direction based on uplink service path and/or uplink service path ID.

In a downlink direction, the line card may use the destination port of a downlink packet 914 to determine the downlink service path and/or downlink service path ID based on the ports configured for the non-transparent service. For example, as shown in the illustration, if the destination IP is an IP for the non-transparent service, and the destination port is in the range 50K-55K, the downlink service path ID 0x0003 may be selected, whereas if the destination IP is an IP for the non-transparent service, and the destination port is in the range 55K-60K, the downlink service path ID 0x0004 may be selected. The non-transparent service module shall choose a downlink service path ID based on the translation mapping configured for the port translator. In some embodiments, the non-transparent module 980 may include an optional indication of downlink service path storage module 983 and an optional cache or other storage 984 to allow for flow learning. These may be similar to those previously described (e.g., in conjunction with FIG. 8). In one aspect, this may help to allow for path switching through one or more non-transparent services. In the downlink direction, the line card may only need to be aware of steering to the first non-transparent module along the path. The first non-transparent module, as well as optionally any other non-transparent modules, may steer using the indication of downlink service path storage module 983 and cache or other storage 984.

This can be further extended to any combination of non-transparent services (NTS) in the packet's path. At the non-transparent service module, the number of port partitions only needs to consider the combination of valid paths for transparent services between the current and next non-transparent service module (if any) in the uplink direction. In the downlink direction packet forwarding rules configured for the non-transparent service module downstream are used to switch downlink service path IDs. The steering between two non-transparent service modules is local and is limited to the set of services between them and could possibly include steering mechanisms based on dynamic flow characterization.

In the description above, a majority of the discussion has pertained to an inter-chassis system of chaining. Other embodiments apply to distributed systems of chaining. Instead of being included within a single chassis network element, the modules and other components may be distributed across multiple network elements in a network. For example, the line cards discussed above may be replaced by switches and/or load balancers and the forwarding controller may be replaced by a network orchestrator.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below. In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc.

Different embodiments of the invention may be implemented using different combinations of software, firmware, and/or hardware. Thus, the techniques shown in the figures can be implemented using code and data stored and executed on one or more electronic devices (e.g., a network element). Such electronic devices store and communicate (internally and/or with other electronic devices over a network) code and data using computer-readable media, such as tangible, non-transitory computer-readable storage media and non-tangible transitory computer-readable communication or transmission media.

A few representative examples of tangible, non-transitory computer-readable storage media include, but are not limited to, magnetic disks, optical disks, random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices, phase-change memory, and the like. The tangible, non-transitory storage media may include one or more solid physical materials, such as, for example, a semiconductor material, a phase change material, a magnetic material, etc. Embodiments pertain to an article of manufacture that includes a tangible non-transitory computer-readable storage media storing a sequence of instructions that if executed by a machine (e.g., a network element, switch, router, computer system, or electronic device) causes or results in the machine performing one or more operations or methods disclosed herein. A few representative examples of non-tangible transitory computer-readable transmission media include, but are not limited to, electrical, optical, acoustical or other form of propagated signals—such as carrier waves, infrared signals, and digital signals.

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method, performed in a network element of a provider edge network, of determining a downlink service path for a downlink packet, the method comprising the steps of:
   receiving an uplink packet that has been transmitted from a subscriber end station toward a provider end station;
   determining an indication of the downlink service path for the downlink packet while processing the uplink packet;
   preserving the indication of the downlink service path;
   receiving the downlink packet at a line card of the network element, wherein the downlink packet has been transmitted from the provider end station toward the subscriber end station;
   determining, at the line card without using an access control list, the downlink service path for downlink packet by using the indication of the downlink service path that was preserved while processing the uplink packet, wherein the downlink service path identifies a plurality of services and an order in which the plurality of services are to be performed on the downlink packet, wherein determining the downlink service path for the downlink packet comprises accessing a stored indication of the downlink service path from a storage by using a plurality of fields derived from the downlink packet; and
   removing the indication of the downlink service path from the storage based on one of a detection of a flow termination and a detection of a flow aging threshold being met.

2. The method of claim 1, wherein the step of determining the downlink service path for the downlink packet comprises determining that a destination port of the downlink packet is one of a set of destination ports that correspond to the downlink service path.

3. The method of claim 2, wherein determining that the destination port is one of the set of the destination ports comprises determining that the destination port is one of a first contiguous range of destination ports that correspond to the downlink service path, and wherein at least a second contiguous range of destination ports correspond to at least another downlink service path.

4. The method of claim 2, wherein the step of preserving the indication of the downlink service path while processing the uplink packet comprises translating a source port of the uplink packet to a translated source port that indicates the downlink service path for the downlink packet, and transmitting the uplink packet that includes the translated source port.

5. The method of claim 2, wherein the step of determining that the destination port is one of the set of the destination ports comprises determining that the destination port is one of the set of the destination ports that correspond to a non-transparent service.

6. The method of claim 1, wherein the step of preserving the indication of the downlink service path comprises storing the indication of the downlink service path in the storage of the line card along with a plurality of fields derived from the uplink packet, wherein the indication of the downlink service path for the downlink packet is determined while processing the uplink packet.

7. The method of claim 1, wherein the step of accessing the stored indication comprises accessing the stored indication of the downlink service path from a cache of the line card by using a plurality of fields sufficient to determine at least a destination Internet protocol (IP) address and a destination port for the downlink packet.

8. The method of claim 1, wherein the step of preserving comprises preserving the indication of the downlink service path which is operable to identify that the order in which the services are to be performed on the downlink packet is a reversal of an order in which the services are to be performed on the uplink packet.

9. The method of claim 1, wherein the step of determining comprises determining, at the line card, the downlink service path for the downlink packet without accessing per-subscriber policy information from the line card and without using an access control list, and wherein the downlink service path identifies at least three services to be performed on the downlink packet.

10. The method of claim 1, wherein the step of determining comprises determining the downlink service path that identifies at least two services selected from a Deep Packet Inspection (DPI) service, a Transparent Internet Caching (TIC) service, a Content Delivery Network (CDN) service, a Network Address Translation (NAT) service, a parental control service, an Internet Protocol Security (IPSec) service, and a firewall service.

11. A network element, which is operable to be deployed in a provider edge network between a subscriber end station and a provider end station, and which is operable to determine a downlink service path for a downlink packet that is to be transmitted from the provider end station toward the subscriber end station, the network element comprising:
  a line card that is operable to receive an uplink packet that has been transmitted from the subscriber end station toward the provider end station;
  an uplink packet processing module that is operable to determine an indication of the downlink service path for the downlink packet while processing the uplink packet and preserve the indication of the downlink service path;
  the line card that is further operable to receive the downlink packet; and
  a downlink service path determination module, which is deployed on the line card, and which is operable to allow the line card to determine the downlink service path for the downlink packet without using an access control list by using the indication of the downlink service path that was preserved by the uplink packet processing module while processing the uplink packet, wherein the downlink service path identifies a plurality of services and an order in which the plurality of services are to be performed on the downlink packet, wherein the downlink service path determination module is operable to determine the downlink service path by accessing a stored indication of the downlink service path from a storage by using a plurality of fields derived from the downlink packet; and wherein the downlink service path determination module is further operable to remove the indication of the downlink service path from the storage based on one of a detection of a flow termination and a detection of a flow aging threshold being met.

12. The network element of claim 11, wherein the downlink service path determination module is operable to determine the downlink service path by determining that a destination port of the downlink packet is one of a set of destination ports that correspond to the downlink service path.

13. The network element of claim 12, wherein the downlink service path determination module is operable to determine the downlink service path by determining that the destination port is one of a range of destination ports that correspond to the downlink service path, and wherein a different range of destination ports corresponds to a different downlink service path.

14. The network element of claim 12, wherein the uplink packet processing module comprises a port translation module that is operable to preserve the indication of the downlink service path while processing the uplink packet by translating a source port of the uplink packet to a translated source port that indicates the downlink service path for the downlink packet, and transmitting the uplink packet that includes the translated source port.

15. The network element of claim 11, wherein the uplink packet processing module comprises a downlink service path storage module that is operable to store the indication of the downlink service path in the storage of the line card along with a plurality of fields derived from the uplink packet, wherein the indication of the downlink service path for the downlink packet is determined while processing the uplink packet.

16. The network element of claim 11, wherein the storage comprises a downlink service path cache of the line card that is operable to store the downlink service path in association with a plurality of fields sufficient to determine at least a destination Internet protocol (IP) address and a destination port for the downlink packet.

17. The network element of claim 11, wherein the downlink service path determination module is operable to determine the downlink service path by determining that a destination port of the downlink packet is one of a set of destination ports that correspond to a set of destination ports that correspond to a non-transparent service.

18. The network element of claim 11, wherein the downlink service path is operable to identify at least two services selected from a Deep Packet Inspection (DPI) service, a Transparent Internet Caching (TIC) service, a Content Delivery Network (CDN) service, a Network Address Translation (NAT) service, a parental control service, and Internet Protocol Security (IPSec) service, and a firewall service.

* * * * *